United States Patent [19]
Herbst et al.

[11] Patent Number: 4,632,802
[45] Date of Patent: Dec. 30, 1986

[54] NUCLEAR PLANT SAFETY EVALUATION SYSTEM

[75] Inventors: John J. Herbst, West Hartford; Richard G. Sider, Granby; Robert E. Jaquith, Somers; Christoffel H. Meijer, Windsor, all of Conn.

[73] Assignee: Combustion Engineering, Inc., Windsor, Conn.

[21] Appl. No.: 418,891

[22] Filed: Sep. 16, 1982

[51] Int. Cl.$^4$ ............................................. G21C 7/36
[52] U.S. Cl. ................................... 376/216; 376/259
[58] Field of Search .............. 340/286 M, 525, 715; 376/215, 216, 217, 218, 245, 259

[56] References Cited

U.S. PATENT DOCUMENTS

| | | | |
|---|---|---|---|
| 3,998,693 | 12/1976 | Musick | 376/217 |
| 4,064,392 | 12/1977 | Desalu | 376/217 |
| 4,105,496 | 8/1978 | Therond | 376/215 |
| 4,330,367 | 5/1982 | Musick | 376/245 |

FOREIGN PATENT DOCUMENTS

| | | | |
|---|---|---|---|
| 51-92996 | 8/1976 | Japan | 376/217 |

OTHER PUBLICATIONS

Larsen et al., Loft Advanced Control Room Operator Diagnostic and Display System (ODDS), IEEE Transactions on Nuclear Science, vol. NS-28, No. 1, Feb. 1981, pp. 782–785.

*Primary Examiner*—Deborah L. Kyle
*Assistant Examiner*—Richard W. Wendtland
*Attorney, Agent, or Firm*—Arthur E. Fournier, Jr.

[57] ABSTRACT

An apparatus for monitoring and evaluating the degree of risk associated with continued operation of a nuclear power plant while one or more plant components has failed or is otherwise unavailable. The apparatus has several functional sections, including means for storing a plant-specific data base of component-level core damage logic paths and component level failure probabilities, means for selecting plant condition scenarios by modifying the component failure probabilities to represent plant components actually or potentially unavailable, means for associating a figure of merit with the change in risk of core damage resulting from the unavailable components, and means for displaying the figure of merit relative to a base or reference value. As an interactive tool in the plant, the apparatus PSES displays the probability or risk of core damage almost instantly for any given state of plant readiness.

7 Claims, 4 Drawing Figures

NUCLEAR PLANT SAFETY EVALUATION SYSTEM

BACKGROUND OF THE INVENTION

This invention relates to nuclear power plants and in particular to a safety monitoring and evaluation system for such plants.

The prior art, as represented by U.S. Pat. No. 4,330,367, SYSTEM AND PROCESS FOR THE CONTROL OF A NUCLEAR POWER SYSTEM, includes on-line, computer-implemented safety monitoring and protection systems. Such systems monitor the status of the plant parameters, identify changes, determine whether the changes require protective action, and initiate necessary protective action early enough during a transient, so that the limit is not violated at any time during the transient. Such a system takes the condition of the plant as a given, and is not used on-line as a tool for plant safety management.

Recently, the nuclear regulatory authorities and the nuclear industry have been interested in managing plant safety by evaluating plant operating experience to obtain a quantitative data base of incidents that decrease the safety margin in the plants. Two major programs established for this purpose were sponsored by the Nuclear Safety Evaluation Center (Significant Event Evaluation and Information Network, NSAC Program Description, Draft Revision One, Nov. 18, 1980) and the Nuclear Regulatory Commission's Office for Analysis and Evaluation of Operational Data, which is described in "New Trends in the Evaluation and Implementation of the Safety-Related Operating Experience Associated with NRC-Licensed Reactors", *Nuclear Safety*, Volume 22, No. 1, January–February 1981. These programs employ an initial screening procedure to assign a level of significance to each reported event. Both are based on manual comparison of event characteristics with a set of qualitative criteria. While the disposition of events classified as significant varies according to the function of the screening organization, the criteria of both organizations are designed to identify events that pose the highest risk to the public and plant. One important subset of these events is that representing the greatest increase in the probability of significant core damage. A quantitative measure of the magnitude of the increase is a direct measure of event significance.

The probability of significant core damage is typically determined using the fault tree-event tree modeling methodology as described in, "Reactor Safety Study, An Assessment of Accident Risks in U.S. Commercial Nuclear Power Plants", NUREG-75/014, WASH 1400, October 1975. The change in the probability that results when a particular component is known to be in the failed state, can be calculated by removing the probability of that component working from all of the fault trees in which it occurs and reevaluating the entire model.

The above-described techniques, and known modifications thereto, are directed toward either immediate evaluation and protection associated with adverse transients in progress, or with assessing the significance of an incident or accident after it has occurred. To some extent, these prior art techniques provide input to design improvements for new plants or for future modifications of existing plants. The prior art does not, however, suggest formal risk assessment techniques for managing plant operating risks to minimize the probability of the occurrence of significant events or to maximize the effectiveness of actions taken during the course of such events.

SUMMARY OF THE INVENTION

The present invention is an apparatus for monitoring and evaluating the degree of risk associated with continued operation of a nuclear power plant while one or more plant components has failed or is otherwise unavailable. The apparatus, hereinafter referred to as the Plant Safety Evaluation System (PSES) is a risk management tool, useful to operating personnel who must decide whether to continue operating a plant despite somewhat degraded safety and auxiliary systems. PSES also helps indicate what changes the operator may implement in the plant to improve the safety status.

The PSES has several functional sections, including means for storing a plant-specific data base of component-level core damage logic paths and component level failure probabilities, means for selecting plant condition scenarios by modifying the component failure probabilities to represent plant components actually or potentially unavailable, means for associating a figure of merit with the change in risk of core damage resulting from the unavailable components, and means for displaying the figure of merit relative to a base or reference value.

As an interactive tool in the plant, the PSES displays the probability or risk of core damage almost instantly for any given state of plant readiness. When a component is removed from or returned to service, the means for selecting and modifying the scenarios is informed and the new plant configuration is represented. In the preferred embodiment the new figure of merit and risk condition of the plant are displayed to the operator in six ways:

1. Current risk status in terms of the probability of a core damage per hour.
2. A history profile of the risk status of the plant.
3. A projection profile of the plant's risk status based on a planned schedule of equipment outages for maintanence and testing.
4. A list of high risk components given the current plant state.
5. A list of high risk event initiators given the current plant state.
6. Qualitative information regarding current status of principle and alternate success paths for maintaining the critical safety functions.

BRIEF DESCRIPTION OF THE DRAWINGS

The preferred embodiment of the invention will be described below with reference to the accompanying drawings, in which.

DESCRIPTION OF THE PREFERRED EMBODIMENT

The purpose the Plant Safety Evaluation System (PSES) is to assist the management and operations staff of a nuclear Power plant in the area of risk management, using information regarding current or proposed states of equipment readiness. The system produces a variety of output displays to provide a quantitative assessment of current and projected risks, as well as qualitative information to focus attention on high risk equipment in the current plant state.

When equipment has failed and is awaiting repair or is temporarily removed from service for testing or maintanence, the readiness or reliability of the associated system is decreased. As a result, the utility is exposed to the increased risk of operating a plant in a degraded state. This increase in risk to the utility and the public is currently controlled by the plant technical specifications, which impose qualitative limits on the increased risk. The risks are expressed in terms of minimum operability requirements for safety related systems. While the technical specifications are useful in their current form the PSES provides supplemental information which can imprve the operator's ability to assess the condition of his plant.

The PSES is a computer based device which relies on probabilistic risk assessment methodology for its initialization data. The data base consists of component level core damage sequences and component reliability data. The output is displayed on a color graphics terminal that is readily accessible by the operator, preferably in the control room.

Figure 1:
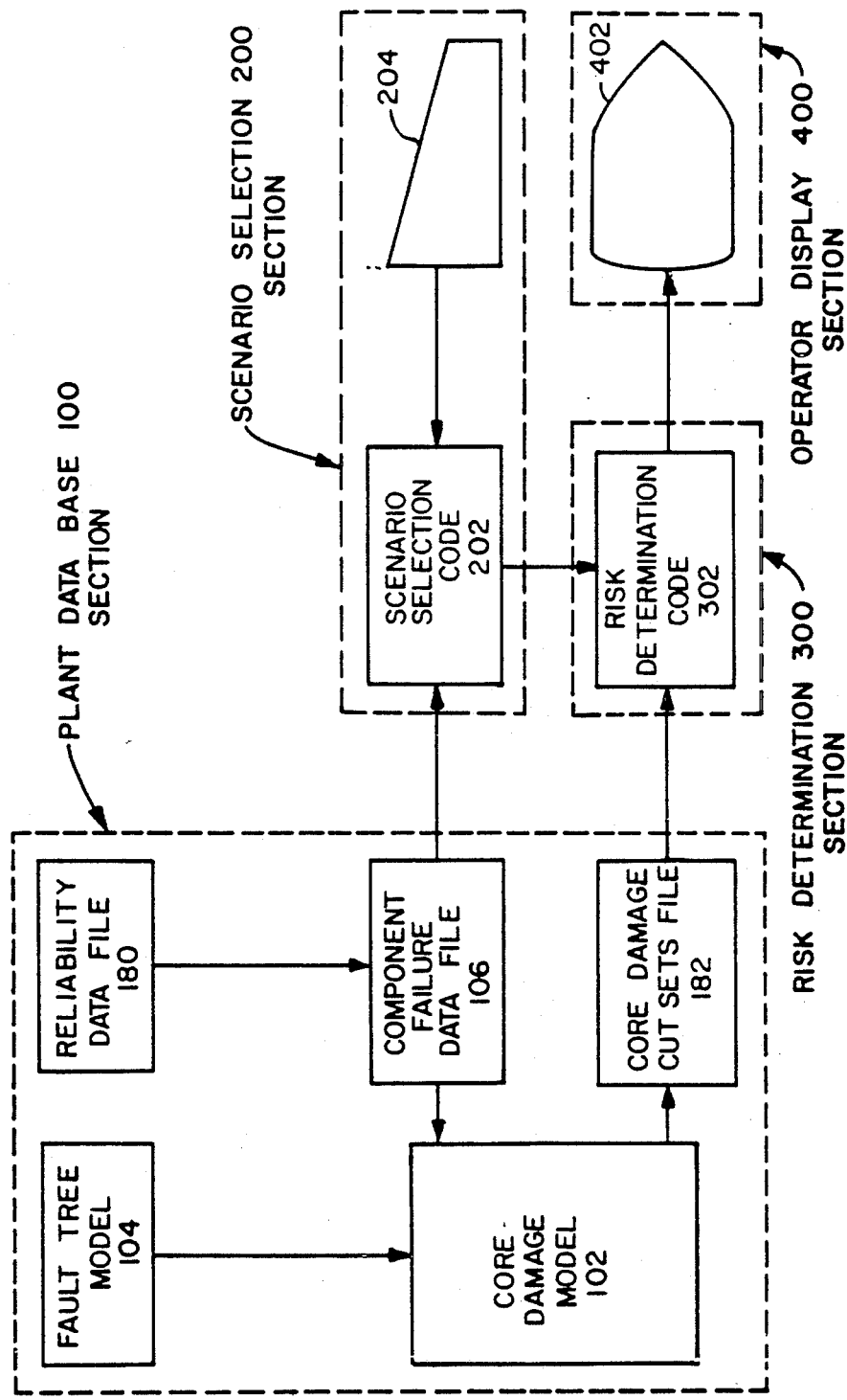
FIG. 1 is a schematic representation of the functional sections and information flow associated with the inventive apparatus.

FIG. 1 generally illustrates the major sections of the plant safety evalation system. The sections have been divided according to functions, but it should be understood that the various models, codes, and files in each section are not necessarily independent and need not be contained in separate hardware.

The plant data base section 100 generally includes means for storing a plant specific data base of core damage logic paths, or cutsets, determined using probabilistic risk assessment methodology. The scenario selection section 200 provides means for selecting and modifying the plant condition, or scenario, to represent plant components actually or potentially unavailable. The risk determination section 300 provides means for associating a figure of merit with a change in risk of core damage resulting from the unavailability of the selected components. The operator display section 400 provides means for displaying the figure of merit and other risk-related information relative to a base or reference.

In the following description, the numeric identification of subsections, codes, files, data bases, or other means or hardware will be a three digit number beginnning with either 1,2,3, or 4. These numbers indicate whether the item referred to is associated with the plant data base section 100, scenario selection section 200, risk determination section 300, or operator display section 400, respectively.

PLANT DATA BASE SECTION 100

The central feature of the plant data base 100 is a core damage model code 102. The core damage model code requires information regarding the fault tree model of the plant 104 and preferably component failure data 106.

In conventional risk assessment studies, core damage models consisted of event trees to enumerate the possible plant responses and fault trees to model the failure of each responding system. The event trees yielded a number of core damage sequences, each of which consisted of an initiating event and a group of responding system failures which would lead to core damage or melt. The fault trees provided the failure probabilities for each of the responding systems and these, together with the initiating event occurrence rate, yielded the core melt sequence occurrence rate associated with the particular sequence.

In the preferred embodiment of the present system, the event tree/fault tree model used in the past is replaced with a single core damage logic model 102, that is capable of modeling the system interactions that exist as a result of shared components or common auxiliary systems. The fault tree model 104 input to the core damage model 102 is preferably based upon the concept of safety functions, as described, for example, in "The Operator's Role and Safety Functions", presented at the Atomic Industrial Forum Workshop on Licensing and Technical Issues-Post TMI, Mar. 9-12, 1980, available as Combustion Engineering publication TIS-6555, and "The Critical Safety Functions and Plant Operation", presented at the IAEA International Conference on Current Nuclear Power Plant Safety Issues, Stockholm, Sweden, Oct. 20-24, 1980 available as Combustion Engineering publication TIS-6743. Safety functions are groups of actions which either prevent core melt or minimize radioactivity releases. The following table contains a list of five anti-core melt safety functions:

TABLE 1

| ANTI-CORE MELT SAFETY FUNCTIONS | |
|---|---|
| SAFETY FUNCTION | PURPOSE |
| Shut reactor down. | To reduce heat production. |
| Reactor coolant system inventory control. | Maintain a coolant medium around core. |
| Reactor coolant system pressure control. | Maintain the coolant in the proper state. |
| Core heat removal. | Transfer heat from core to a coolant. |
| Reactor coolant system heat removal. | Transfer heat from the core coolant. |

The core damage model 102 is based on the premise that substantial core damage would result from the failure to maintain any one of the anti-core melt safety functions, to the extent that the core became uncovered. The core damage model 102 incorporates a fault tree model 104 in a tree format that models the failure to maintain a safety function as a challenge to a safety function (i.e. an initiating event) in combination with the failure of the associated required responses.

Figure 2:
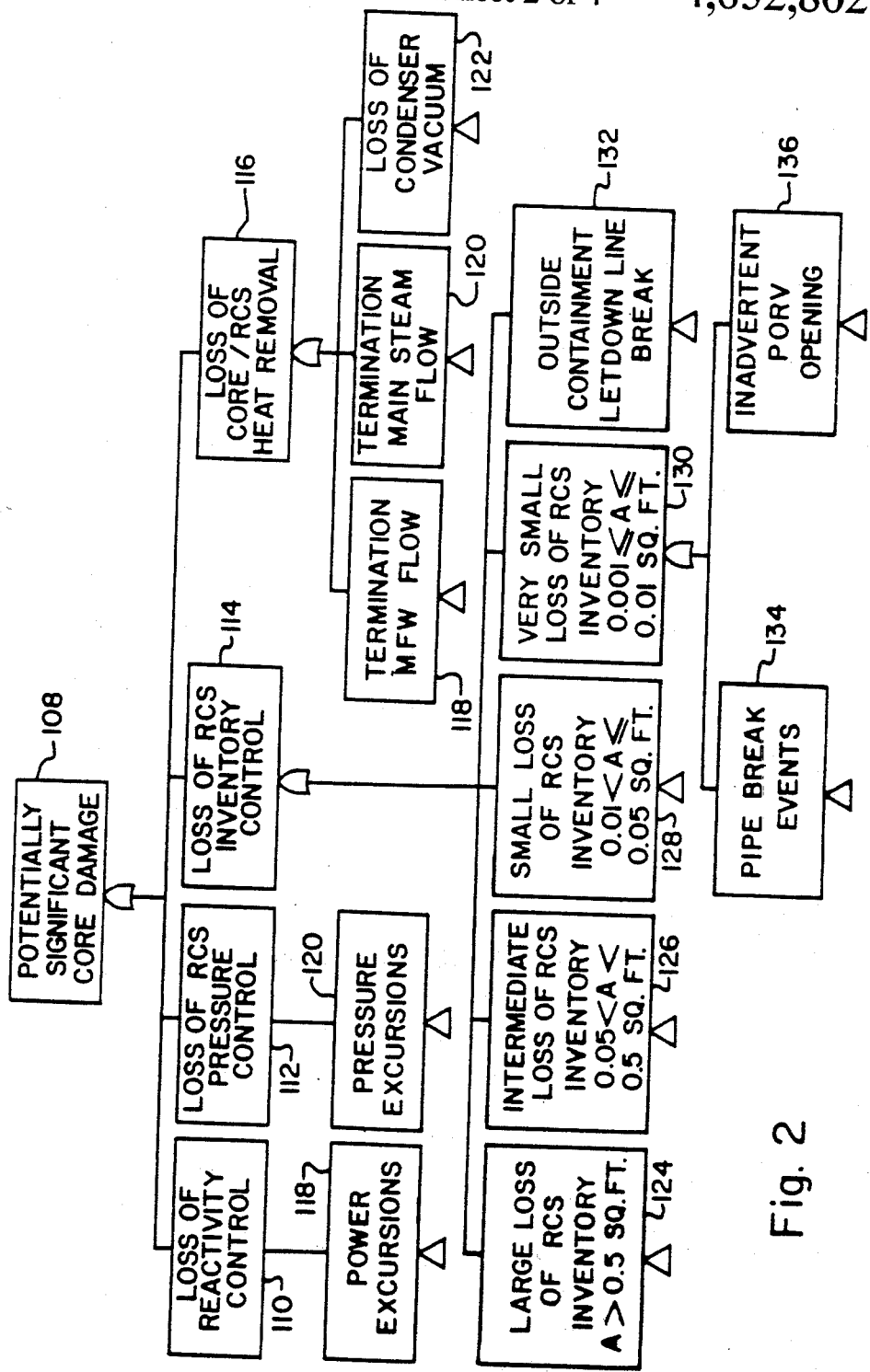
FIG. 2 is a diagram showing the top portion of a core damage logic diagram associated with a typical pressurized water nuclear power plant.

Referring now to FIG. 2, the logic structure at the very top of the core damage model code 102 is shown. This figure illustrates the basic assumption that significant core damage results from loss of a safety function. Note that for convenience in constructing the model 102, the core and reactor coolant system (RCS) heat removal safety functions have been combined. The ultimate risk, significant core damage, can result from total or partial loss of either reactivity control 110, reactor coolant system pressure control 112, reactor coolant system inventory control 114, or loss of core or reactor coolant system heat removal 116. Loss of reactivity control results, from a power excursion 118. Loss of reactor coolant system pressure control is a result of a pressure excursion 120. Loss of heat removal capability is a result of either termination of main feed water flow to the steam generator 118, termination of main steam flow from the steam generator 120 or loss of condenser vacuum 122. Loss of reactor coolant system inventory control 114 results from a break in the reactor coolant system boundary. Break sizes are typically catagorized according to the required response to large loss 124 (break area greater than 0.5 square feet), intermediate loss 126 (between 0.05 and 0.5 square feet), small size 128 (between 0.001 and 0.05 square feet), very small size 130 (between 0.001 and 0.01 square feet), and a containment letdown line break outside the reactor containment 132.

For purposes of illustrating the preferred embodiment, the core damage model will be further described only with respect to events and components associated with the very small loss of reactor coolant system inventory 130, but it should be understood that similar model logic is required for each of the other core damage paths. The very small loss of inventory 130 can result from either a pipe break event 134 or the inadvertent opening of a power operated relief valve 136. Each can be considered an initiating event, incident, or transient.

Figure 3:
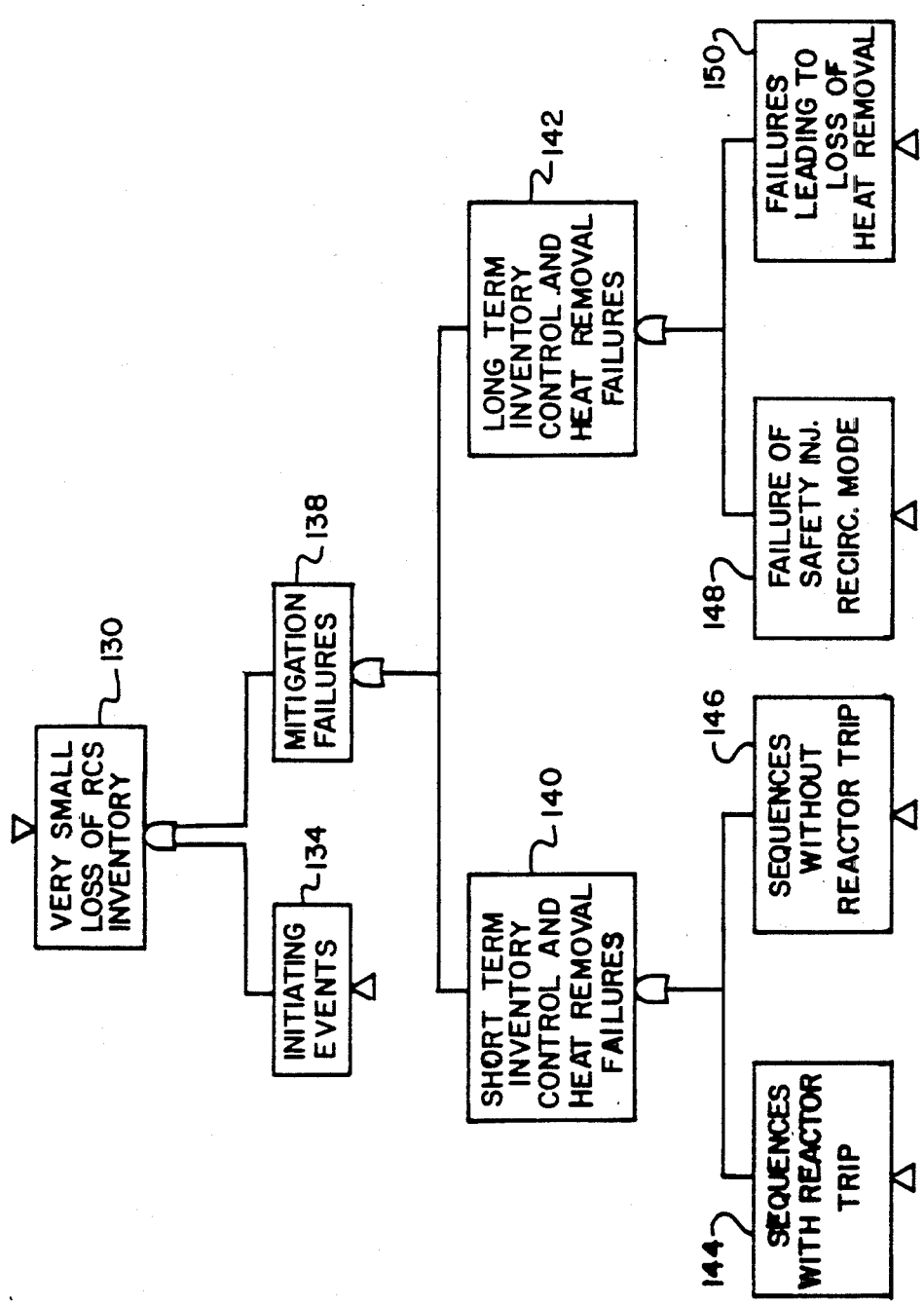
FIG. 3 is a logic diagram illustrating the mitigation response logic associated with an incident in which a small amount of coolant is lost from the reactor coolant system.

Referring now to FIG. 3, a portion of the core damage model representing the mitigating response associated with the initiating event 134 or 136, is shown. It should be understood that the design of the plant is based on providing redundant mitigating actions in response to an initiating event. This is, in effect, the base level of risk associated with operation of the plant as designed. The purpose of the present invention is to determine the change in base level risk associated with changes in equipment status relative to the designed mitigation action. Accordingly, the logic sequence associated with mitigation failures 138 is a necessary input to the core damage model 102.

A mitigation failure in response to loss of inventory 130 could be either a failure of short term inventory control and heat removal 140 or a long term failure of inventory control and heat removal 142. The short term loss 140 could arise either with an associated reactor trip 144 (which thereby reduces the heat generated in the core), or without a reactor trip 146. Likewise the failure of long term inventory and heat removal 142 could result from failure of the safety injection recirculating mode 148 or failures leading to loss of heat removal capability 150.

Each of the four failures, 144,146,148, and 150 in turn can result from a failure of a component or failure of an associated system within the mitigation sequence. Thus, the logic scheme could be completed on the basis of the fault tree model input 104 to the core damage model 102. Completion of FIG. 3 would include the logic for the response failures to the safety function element level. A safety function element is essentially a subset of related actions within a safety function. At this level in tree development, the core damage model 102 serves the same purpose as that served by plant event trees in most probabilistic risk assessments performed in the prior art.

With the present invention, the core damage model 102 is further refined to include responses at the individual component level. This allows consideration of system interactions in which the component failure that causes an initiating event also can adversely effect the protective responses. Referring again to FIG. 3, the completion of the logic for the failure of the safety injection recirculation mode 148 would include all components which would normally be required to effect the safety injection recirculation mode. Representative logic modeling for the safety injection recirculation mode is shown and described in the above-referenced Reactor Safety Study (WASH 1400), which is hereby incorporated by reference.

Referring again to FIG. 1, the core damage model 102 can be kept to a manageable size by utilizing the reliability data associated with each component, as stored in file 106. Each core damage cutset can be quantitatively evaluated and those with very low probability can be eliminated from the core damage cutset file 182. The component failure data 106 includes input from a reliability data file 180, which is assembled on the basis of both industry-wide and plant historical component failure data. Conventional techniques to account for random failures are suitable. Component failures that are the cause of various initiating events are also included in the reliability data file 180.

Having compiled the input data from the fault tree model 104 and preferably, component failure data 106, the core damage model code 102 reduces the core damage logic to its constituent minimal cutsets and stores them in a core damage cutset file 182. Each cutset consists of an initiating event (such as 134 in FIG. 3) and the necessary component failures to prevent an adequate response to the initiating event. The technique of using cutsets to reduce the enormous amount of data embodied in a typical fault tree, in order to obtain a time dependent fault tree evaluation, was set forth in, "A Time Dependent Methodology for Fault Tree Evaluation" by W. E. Veseley, published in *Nuclear Engineering and Design*, Volume 13 (1970) pp. 337-360, which is hereby incorporated by reference.

A number of publicly available fault tree analysis computer codes such as PREP, MOCUS, or SETS, can be used to reduce the core damage model code 102 to its minimal cutsets for storage on file 182. The PREP code, developed by W. E. Veseley and R. E. Narum, is available as "PREP and KITT Computer Codes for the Automatic Evaluation of a Fault Tree", Idaho Nuclesr Corporation, IN-1349, August 1970.

Most of the information for generation of the core damage cutsets would be available from a level one probabilistic risk analysis (PRA) of the type now, or soon to be, required by the U.S. Nuclear Regulatory Commission (NRC) for each commercial power plant. A level one PRA can be constructed according to "PRA Procedures Guide", review draft, Sept. 28, 1981, available from the NRC as Nureg/CR-2300.

It should be understood that the above represents one approach to development of the core damage logic model 102. Other valid approaches are possible. The end result of the logic process is development of a comprehensive list of core damage cutsets 182. The cutset file 182 can be generated off-line, the only requirement being that the file 182 be accessible by the other sections of the PSES, as described below. The cutset file 182 is specific to the design of the plant, not the moment-to-moment plant condition, and accordingly does not require updating unless the plant design is changed or the core damage model 102 is altered. Typically, a large computer, such as a CDC 7600, would be required to generate the cutset file 182.

The component failure file 106 is also specific to the design of the plant, not to the condition, or status, of the plant. This file must also be accessible to other sections of the PSES.

SCENARIO SELECTION SECTION 200

The operator defines a chosen plant condition through the scenario selection code 202, which accesses the component failure data file 106. The scenario selection section 200 preferably includes a keyboard 204 which may be separate or joined with the operator display screen 402.

When a component is removed from or returned to service, the PSES is informed of the change either directly by on-line monitoring, or indirectly by the operator entering the changes through the keyboard 204 to the scenario selection code 202. The selection code 202 in turn provides input to the risk determination code 302 including modification of component failure probabilities to represent plant components actually or potentially unavailable. The component failure data file 106, core damage model code 102 and core damage cutset file 182 are not modified to reflect the new plant configuration.

RISK DETERMINATION SECTION 300

The risk determination section 300 provides the rapid interaction between the scenario selection section 200 and the operator display section 400. The risk assessment or determination code 302 accesses the core damage cutset file 182 from the plant data base section 100 and the complete characterization of component failures from the scenario selection code 202. These failures include the statistical unavailabilty and unreliability from subsections 106 and 180 as well as the actually known or projected failures or unavailabilities entered from the console or keyboard 204. The risk determination code uses as its core damage logic scheme only the cutsets 182 affected by the component state changes and not the entire core damage model code 102 or cutset file 182. As a result the risk determination hardware 302 can be a relatively small, fast running, mini-computer.

The risk determination section 300 is thus a computer based apparatus which receives equipment status inputs from selection code 202, accesses the core damage cutset data base 182, performs the necessary calculations and provides input to the operator display section 400. The calculation of the core-damage occurrence rate is based on the following relations:

1. The core damage occurrence rate, W, is the sum of the minimal cutset occurrence rates $w_i$, that is, $$W = \sum_{i=1}^{N} w_i$$

where N equals the number of core-melt cutsets in file 182.

2. The occurrence rate of each cutset, $w_i$, is the product of the initiating event occurrence rate, $\lambda_i$, and the total failure probabilities of each of the components, $q_{ij}$, that is, $$w_i = \lambda_i \prod_{j=1}^{N_c} q_{ij}$$

where $N_c$ equals the number of components in the cutset and $q_{ij}$ represents the failure probability of component j during the period of time that the cutset i scenario is in progress.

Most equipment outages have durations on the order of hours and, as a result, the configuration of the plant and the damage occurrence can be expected to change on a similar time scale. Thus, the risk assessment is determined on an hourly basis rather than, for example, a yearly basis. The risk determination section 300 preferably starts with a base value of the hourly core-damage rate and, as each piece of equipment or component is entered as unavailable (through keyboard 204 and scenario selection code 202), the assessment code 302 determines the change in core-damage occurrence rate. The change in occurrence rate is simply the sum of the changes in the cutset occurrence rate, $$\Delta W = \sum_{i=1}^{N} \Delta w_i$$

Note that $w_i$ is zero for cutsets that do not contain the affected components. For those cutsets that do contain affected components, $\Delta w_i$ is the difference between $w_i$ with the affected component $q_{ij}$ set to one and with $q_{ij}$ left at the normal value.

The risk assessment code 302 in the preferred embodiment is a modified version of the SIEVE computer code, available from the Electric Power Research Institute, Palo Alto, Calif. SIEVE calculates the resulting change in core-melt probability over the failure duration, when fed a list of failed components and associated failure duration times. The modification for the present invention calculates the hourly core-damage occurrence rate rather than the core-damage probability over the existence time of the failure.

OPERATOR DISPLAY SECTION 400

Figure 4:
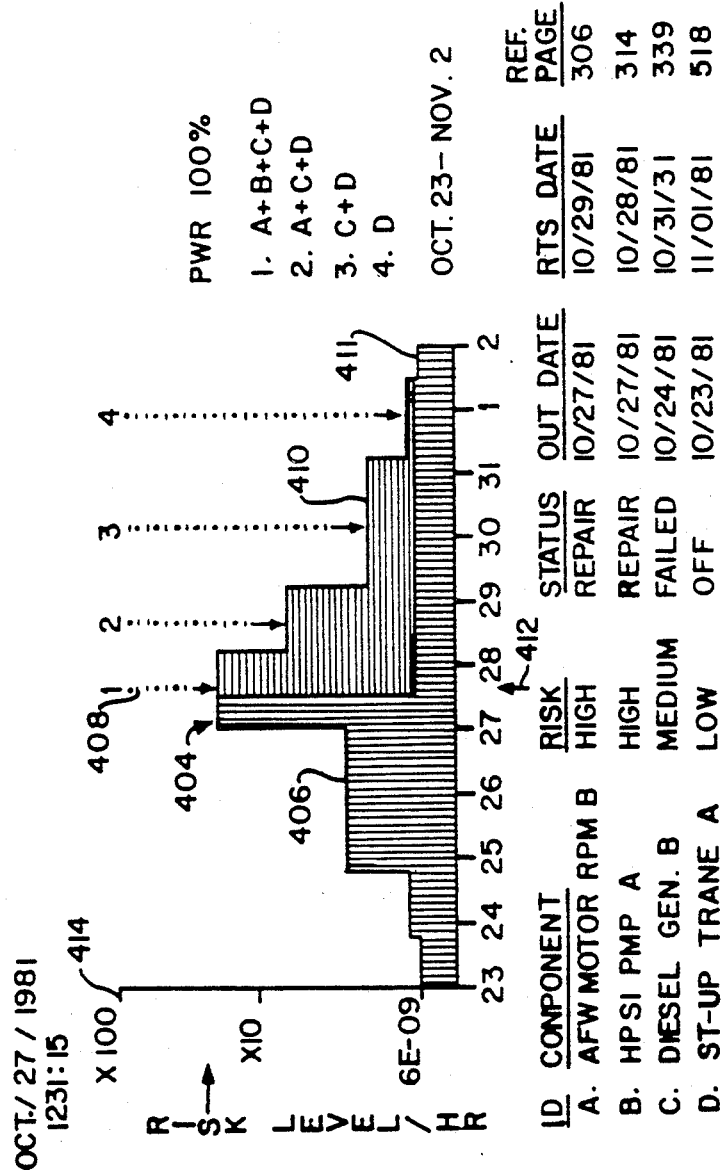
FIG. 4 is representative of the display to the operator of the risk and status information provided by the invention.

An output device, preferably in the form of a screen display 402 is also provided, on which the relevant output information can be readily understood by the operator. Referring now to FIG. 4, the preferred output display 402 is illustrated. The graphic portion 404 of the display contains the past risk profile 406, the current risk level 408, and the projected risk profile 410. It is essentially a graph of the hourly core-damage occurrence rate covering a ten day period from five days prior to the current date to five days beyond the current date. Optionally, the display could be designed to access a file of accumulated risk assessment such that the display period could be variable over a time of up to six months. The nominal "as built" plant (or complete component availability) base level risk 411 is also shown.

The past risk profile provides the operator with a view of the extended risk trends at the plant and with a measure against which to compare the current plant risk level. The current risk level 408 allows the operator to assess the current condition of his plant, using both the absolute wide axis scale 414 and the comparison with past risk history as a basis for permitting or restricting the continued operation of the plant.

The projected risk 410 is provided to permit the operator to evaluate planned changes in equipment status. This can be applied in two ways, i.e. to assess the risk of removing one more piece of equipment from service or to evaluate a more extensive maintanence or testing outage plan involving several pieces of equipment with various expected down times.

FIG. 4 shows a profile pattern equivalent to returning components B,A,C and D to service, in that order, with B having been down for roughly thirty hours, A for eighty two hours, C for one hundred and eight hours, and D for one hundred and twenty six hours. Note that the arrows labeled one through four indicate the combinations of unavailable components which are enumerated to the right of the draft. In evaluating a maintanence outage plan, the schedule could be adjusted to minimize the total risk to which the plant is exposed.

The table 416 at the bottom of the graph lists the components which are currently unavailable, in descending order with respect to their impact on the risk. For example, return of the "B" motor driven auxiliary feed water pump (component A) to service will result in the greatest decrease in the risk level from that identified as level number one. Risk contribution is also qualitatively specified as high, medium or low for each component. The status of the equipment is specified, as is the date on which the component was removed from service and the expected date of its return.

PSES OPERATION

The PSES is advantageously used in the control room of the power plant by the operator who has ready access to the hardware 204 and 402 as represented in FIG. 1. Referring to a list of components that constitute the various cutsets in file 182, the operator identifies the components which are specified as being failed in the subject event. For example, he may enter information through keyboard 204 describing an event with, for example, ten failed components and the associated existence time of each failure. The resulting risk figure of merit is then displayed to the operator on, for example, screen 402. Preferably, means are also provided for entering the figure of merit into a separate data storage base for subsequent documentation or retrieval in connection with generating a historical profile of the risk level of the plant.

It should be appreciated that the specification of component failures as represented by keyboard 204 could also be generated automatically in response to status indications from sensors associated with various key components. The existence time of these component failures would be assumed as one hour for the purpose of the PSES generating a risk figure of merit representing the present risk status of the plant per hour of continued plant operation. Preferably, the means for specifying the failed components, as represented by keyboard 204, include a selector switch by which the operator can completely control the specification of failed components through keyboard 204, or in an automatic mode, the input to scenario selection code 202 could be generated directly from component sensors and associated signal processing equipment.

We claim:

1. In a nuclear power plant having a reactor core, a multiplicity of plant components for providing reactor safety functions including reactor shutdown, reactor coolant inventory control, reactor coolant pressure control, reactor core heat removal, and reactor coolant heat removal, and a plant control room including means for generating a status signal indicative of the availability of at least some of said components, an improved safety evaluation system comprising:

means for storing a plant-specific data base including component level core damage logic paths and the failure probability of each component, said logic paths being in the form of constituent cutsets, each of said cutsets consisting of a representation of an initiating event and the necessary component failures that would prevent an adequate plant response to avoid core damage;

means for selecing plant condition scenarios by modifying at least one of said component failure probabilities to represent plant components actually or potentially unavailable;

means responsive to the means for storing a plant-specific data base and the means for selecting plant condition scenarios, for associating a risk figure of merit with the change in the core damage occurrence rate resulting from the unavailable components, said means for associating a risk figure of merit including a computer implemented program for determining the core damage occurrence rate according to $$W = \sum_{i=1}^{N} w_i$$

where W is the sum of the cutset occurrence rates, N equals the number of core damage cutset, and wherein $$w_i = \lambda_i \prod_{j=1}^{N_c} q_{ij}$$

where $\lambda_i$ is the initiating event occurrence rate and $q_{ij}$ is the failure probability of component j during the period of time that the cutset i scenario is in progress; and means for displaying the figure of merit relative to a base reference value, including a console screen having means for projecting a graph representing the risk figure of merit over a period of at least several days preceding and following the present moment of interest, said graph including a base line indication of the risk figure of merit associated with the nominal availability of all components.

2. The plant safety evaluation system of claim 1 wherein the means for selecting plant condition scenarios includes means for accessing said component level failure probability data base and means responsive to said status signals in the control room for altering the failure status of selected components.

3. The plant safety evaluation system of claim 2 wherein the means for specifying the component's status includes a console means including a keyboard.

4. The plant safety evaluation system of claim 3 wherein said console includes means for selecting the component failure specification from either the keyboard or from component sensor means.

5. The plant safety evaluation system of claim 1 wherein the means for displaying the figure of merit includes a display of the current risk status, a history profile of the risk status, a list of high risk components given the current plant condition, and a list of high risk event initiators given the current plant condition.

6. The plant safety evaluation system of claim 1 wherein the means for associating a risk figure of merit is programmed to access from the means for storing a plant-specific data base, only the component level core damage logic paths that include component failure probabilities modified in the means for selecting plant condition scenarios.

7. The plant safety evaluation system of claim 6 wherein the means for associating a risk figure of merit are embodied in a mini-computer.

* * * * *